US011622194B2

(12) United States Patent
Ru et al.

(10) Patent No.: US 11,622,194 B2
(45) Date of Patent: Apr. 4, 2023

(54) DEEP LEARNING SPEAKER COMPENSATION

(71) Applicant: Nuvoton Technology Corporation, Taiwan (CN)

(72) Inventors: Powen Ru, San Jose, CA (US); Jin Hee Kim, San Jose, CA (US); Nathan Wong, San Jose, CA (US); Pratul Saini, Elk Grove, CA (US)

(73) Assignee: Nuvoton Technology Corporation, Hsinchu (TW)

( * ) Notice: Subject to any disclaimer, the term of this patent is extended or adjusted under 35 U.S.C. 154(b) by 284 days.

(21) Appl. No.: 17/137,260

(22) Filed: Dec. 29, 2020

(65) Prior Publication Data

US 2022/0210555 A1 Jun. 30, 2022

(51) Int. Cl.
*H04R 3/04* (2006.01)
*H04R 25/00* (2006.01)
*H04R 29/00* (2006.01)
*G06N 3/04* (2023.01)
*G06N 3/08* (2023.01)

(52) U.S. Cl.
CPC ............... *H04R 3/04* (2013.01); *G06N 3/04* (2013.01); *G06N 3/08* (2013.01); *H04R 25/507* (2013.01); *H04R 29/001* (2013.01); *H04S 2400/09* (2013.01)

(58) Field of Classification Search
CPC ...... H04R 3/04; H04R 25/507; H04R 29/001; G06N 3/04; G06N 3/08; H04S 2400/09
USPC ......................................................... 381/94.9
See application file for complete search history.

(56) References Cited

U.S. PATENT DOCUMENTS

| 2008/0037804 | A1* | 2/2008 | Shmunk .................. H04S 7/301 381/59 |
| 2015/0201294 | A1* | 7/2015 | Risberg .................. H04R 3/002 381/59 |
| 2017/0006394 | A1* | 1/2017 | Risberg .................. H04R 3/007 |
| 2018/0122401 | A1* | 5/2018 | Iyer ......................... G10L 25/30 |
| 2018/0136899 | A1* | 5/2018 | Risberg .................... H04R 3/04 |

\* cited by examiner

*Primary Examiner* — Vivian C Chin
*Assistant Examiner* — Douglas J Suthers
(74) *Attorney, Agent, or Firm* — Kilpatrick Townsend & Stockton LLP

(57) ABSTRACT

A recurrent neural network is employed in a loudspeaker system to compensate the distortion of the system based upon a source signal (content) and the sensing output of a sensing circuit (context). A frequency domain transform is selected to provide mapping between the source signal and a recorded signal; and enable reconstruction of desirable playback. Various sensing-related features and source-related features are derived to serve as the auxiliary information. A desirable content is therefore generated based upon the original content and the context.

16 Claims, 13 Drawing Sheets

DEEP LEARNING SPEAKER COMPENSATION

BACKGROUND OF THE INVENTION

The present invention relates to loudspeaker devices, systems, and methods. More specifically, embodiments of the present invention apply a neural network to compensate for the distortion caused by the imperfectness of the playback path of the loudspeaker systems.

Loudspeakers are known to suffer from distortions, linear or nonlinear, producing undesirable playback. Most available products offer linear compensation like filtering, equalization, and/or automatic gain control. Only a few products offer working nonlinear compensation. However, nonlinear compensation requires in-depth knowledge of the physics of each component of the loudspeaker systems. Therefore, existing nonlinear compensation systems are complicated and costly.

Therefore, improved methods and systems that address some of the limitations described above are desired.

BRIEF SUMMARY OF THE INVENTION

In some embodiments of the invention, a recurrent neural network is employed in a loudspeaker system to compensate the distortion of the system based upon a source signal (content) and the sensing output of a sensing circuit (context). A frequency domain transform is selected to provide mapping between the source signal and a recorded signal; and enable reconstruction of desirable playback. Various sensing-related features and source-related features are derived to serve as the auxiliary information. A desirable content is therefore generated based upon the original content and the context.

Embodiments of the invention provide a loudspeaker system for playing an acoustic signal. The loudspeaker system includes a processor for receiving a source signal and producing a processed signal, an amplifier for amplifying the processed signal to provide an amplified signal, and a loudspeaker for receiving the amplified signal and producing an output signal. The processor is configured to, in a deploying phase, use a recurrent neural network (RNN) with trained parameters to compensate the source signal to produce the processed signal. The RNN is trained to produce the trained parameters based on the source signal and the output signal.

Some embodiments of the invention provide a loudspeaker system. The loudspeaker system includes a loudspeaker to play back an acoustic signal based upon an amplified signal, with an amplifier connected to the loudspeaker. The amplifier is configured to receive a justified source signal, generate the amplified signal based upon the justified source signal, and transmit the amplified signal to the loudspeaker. The loudspeaker system also includes a sensing circuit connected to the amplified signal. The sensing circuit is configured to measure a voltage and a current of the amplified signal and generate a sensing output signal including the measured voltage and the measured current. The loudspeaker system also includes a processor configured to receive a source signal and the sensing output signal, derive sensing-related features based upon the sensing output signal, transform the source signal to a reconstructable frequency domain representation, derive source-signal-related features, deploy a trained recurrent neural network (RNN) to convert the reconstructable frequency domain representation to a justified frequency domain representation based upon the sensing-related features derived from the source signal and the sensing output signal, inversely transform the justified frequency domain representation to the justified source signal, and send the justified source signal to the amplifier.

In some embodiments of the loudspeaker system, the sensing-related features include resistance, conductance, differential resistance, or differential conductance.

In some embodiments of the loudspeaker system, the sensing-related features include instantaneous power or root-mean-square power.

In some embodiments of the loudspeaker system, the reconstructable frequency domain representation is fast Fourier transform (FFT) or discrete Fourier transform (DFT).

In some embodiments of the loudspeaker system, the reconstructable frequency domain representation is modified discrete cosine transform (MDCT) or modified discrete sine transform (MDST).

In some embodiments of the loudspeaker system, the reconstructable frequency domain representation is constant-Q transform (CQT).

In some embodiments of the loudspeaker system, the reconstructable frequency domain representation is variable-Q transform (VQT) using a filter channel distribution according to equivalent rectangular bandwidths (ERB) or Bark scale.

In some embodiments of the loudspeaker system, the source-signal-related features comprise one or more of mel-frequency cepstral coefficients (MFCC), or perceptual linear prediction (PLP), spectral centroid, spectral flux, and spectral roll-off.

In some embodiments of the loudspeaker system, the source-signal-related features comprise one or more of zero crossing rate, peak frequency, crest factor, energy entropy, mean magnitude, root-mean-square value, skewnsess, kurtosis, and maximum magnitude.

In some embodiments of the loudspeaker system, the recurrent neural network is a gate recurrent unit (GRU).

In some embodiments of the loudspeaker system, the recurrent neural network is a long-short-term memory (LSTM).

In some embodiments of the loudspeaker system, the recurrent neural network comprises a memory device storing a plurality of parameters of the recurrent neural network.

In some embodiments of the loudspeaker system, the recurrent neural network is trained with a setup including a microphone configured to convert the acoustic signal played back by the loudspeaker to a recorded signal, a first delay device configured to synchronize the source signal with the recorded signal, a second delay device configured to synchronize the sensing output signal with the recorded signal, and a neural network training device. The neural network training device is configured to receive the source signal and the sensing output signal, derive the sensing-related features based upon the sensing output signal, transform the source signal to a first frequency domain representation, derive the source-signal-related features, transform the recorded signal to a second frequency domain representation, and train the plurality of parameters of the recurrent neural network based upon the first frequency domain representation, the second frequency domain representation, and the sensing-related features derived from the source signal and the sensing output signal. The trained recurrent neural network is bypassed during training phase and the justified source signal is the source signal.

In some embodiments, the recurrent neural network is trained by a forward training scheme that the first frequency domain representation is designated as an input and the second frequency domain representation is designated as a desired output.

In some embodiments, the recurrent neural network is trained by an inverse training scheme where the second frequency domain representation is designated as an input and the first frequency domain representation is designated as a desired output.

Some embodiments of the invention provide a method for playing an acoustic signal in a loudspeaker system. The loudspeaker system includes a processor for receiving a source signal and producing a processed signal, an amplifier for amplifying the processed signal to provide an amplified signal, and a loudspeaker for receiving the amplified signal and producing an output signal. The method includes, in a training phase, training a recurrent neural network (RNN) to produce trained parameters based on the source signal and the output signal, and, in a deploying phase, using the RNN with the trained parameters to compensate the source signal to produce the processed signal.

In some embodiments, the method includes, in the training phase, deriving sensing-related features based upon sensed output signal, using a microphone configured to convert the acoustic signal played back by the loudspeaker to a recorded signal, transforming the source signal to a first frequency domain representation, transforming recorded signal of output signal to a second frequency domain representation, and training the RNN to produce trained parameters based upon the first frequency domain representation, the second frequency domain representation, and the features derived from the source signal and the sensed output signal.

In some embodiments, the method includes, in the deploying phase, receiving the source signal and sensing the output signal, deriving sensing-related features based upon sensed output signal, transforming the source signal to a reconstructable frequency domain representation, deploying the trained RNN with the trained parameters to convert the reconstructable frequency domain representation to a compensated frequency domain representation based upon the features derived from the source signal and the sensed output signal, inversely transforming the compensated frequency domain representation to a compensated source signal, and sending the compensated source signal to the amplifier.

In some embodiments of the above method, the recurrent network is trained by a forward training scheme that the first frequency domain representation is designated as an input and the second frequency domain representation is designated as a desired output.

In some embodiments of the above method, the recurrent network is trained by an inverse training scheme where the second frequency domain representation is designated as an input and the first frequency domain representation is designated as a desired output.

BRIEF DESCRIPTION OF THE DRAWINGS

For a more complete understanding of the disclosure, reference should be made to the following detailed description and accompanying drawings wherein.

DETAILED DESCRIPTION OF THE INVENTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will convey the scope. Among other things, the features of the disclosure can be facilitated by methods, devices, and/or embodied in articles of commerce. The following detailed description is, therefore, not to be taken in a limiting sense.

Figure 1:
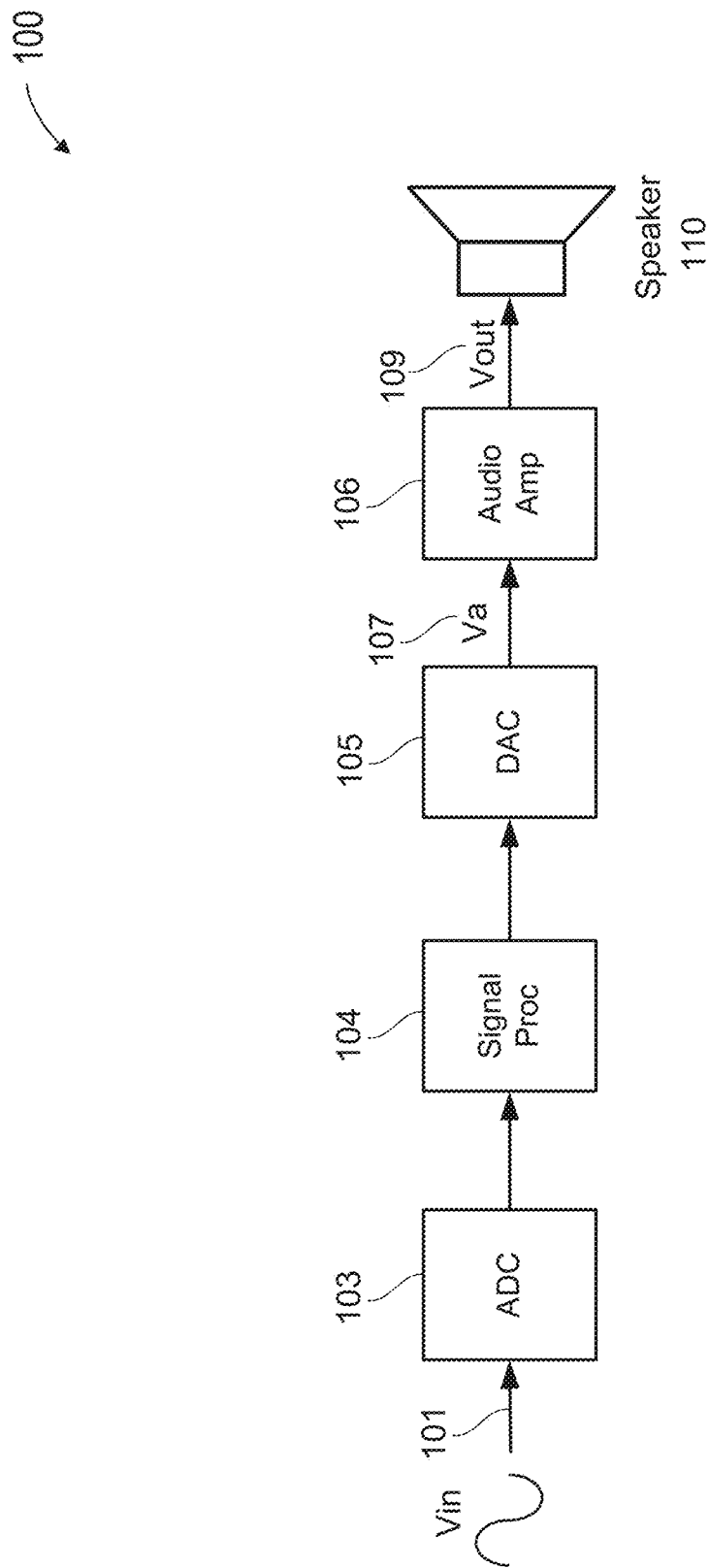
FIG. 1 is a block diagram illustrating an audio system.

FIG. 1 is a block diagram illustrating an audio system. As shown in FIG. 1, audio system 100 is configured to receive an audio input signal Vin 101 and to provide an audio output signal Vout 109 to a speaker 110. Audio system 100 includes an analog-to-digital converter (ADC) 103, a digital signal processing unit 104, a digital-to-analog converter (DAC) 105, and an audio amplifier unit 106. The output from the DAC is an analog signal Va 107 that feeds into speaker 110. The functions of these components are not explained in detail here.

Figure 2:
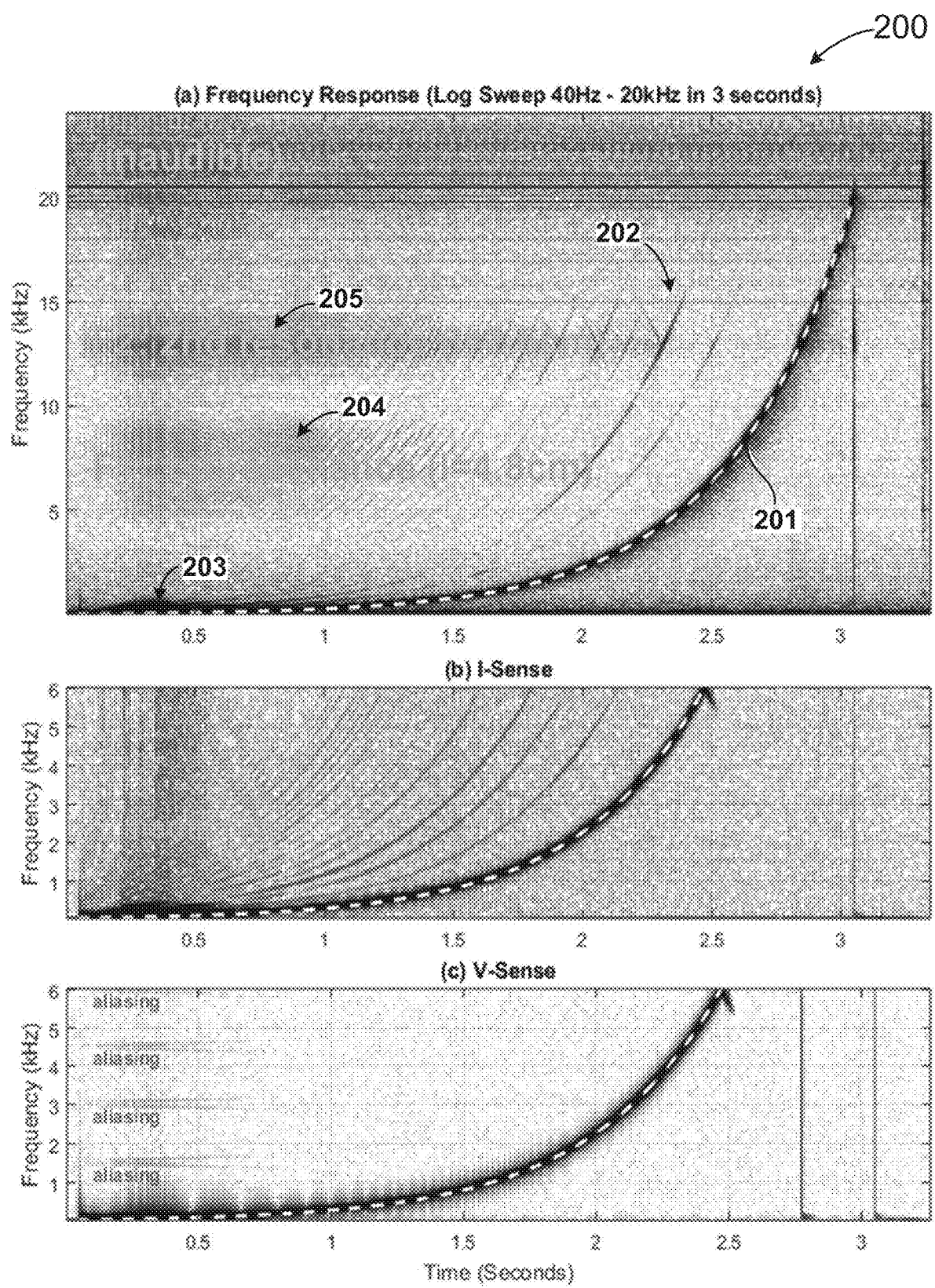
FIG. 2 depicts the spectrograms of a recorded sweeping tone and sensed current and voltage signals according to some embodiments of the present invention.

FIG. 2 depicts the spectrograms of a recorded sweeping tone and sensed current and voltage signals, according to some embodiments of the present invention. In FIG. 2, diagram (a) shows a spectrogram of the recorded signal of a play back of a sweeping tone. The horizontal axis shows the time, from zero to three seconds, and the vertical axis shows the frequency of the detected signal. The main dark trace 201 highlighted by a dashed curve (from a little later than 0 second, 40 Hz, to a little later than 3 seconds, 20000 Hz) is the expected response of the sweeping tone. The minor traces 202 above the main trace indicate the induced harmonics. A horizontal dark portion at the bottom 203 shows the low frequency noise. Two minor horizontal traces at about 7000 Hz (204) and 13000 Hz (205) indicate the resonances due to the dimensions of the system.

In FIG. 2, diagram (a) illustrates various distortions in the audio system. In some embodiments of the present invention, a recurrent neural network is employed in a loudspeaker system to compensate the distortion of the system based upon a source signal (content) and the sensed or recorded output signal of a sensing circuit (context). In an example, a frequency domain transform is selected to provide mapping between the source signal and a recorded signal and to produce reconstruction of desirable playback. Various sensing-related features and source-related features are derived to serve as auxiliary information. A desirable content is therefore generated based upon the original content and the context using the recurrent neural network. In some embodiments, machine learning is employed to determine the mapping between the source and the distorted playback, so that the source can be justified or compensated to produce desired playback.

Embodiments of the invention provide a loudspeaker system for playing an acoustic signal. The loudspeaker system includes a processor for receiving a source signal and producing a processed signal, an amplifier for amplifying the processed signal to provide an amplified signal, and a loudspeaker for receiving the amplified signal and producing an output signal. The loudspeaker system is configured to, in a training phase, train a recurrent neural network (RNN) to produce trained parameters based on the source signal and the output signal, and, in a deploying phase, use the RNN with the trained parameters to compensate the source signal to operate the loudspeaker system.

Figure 3:
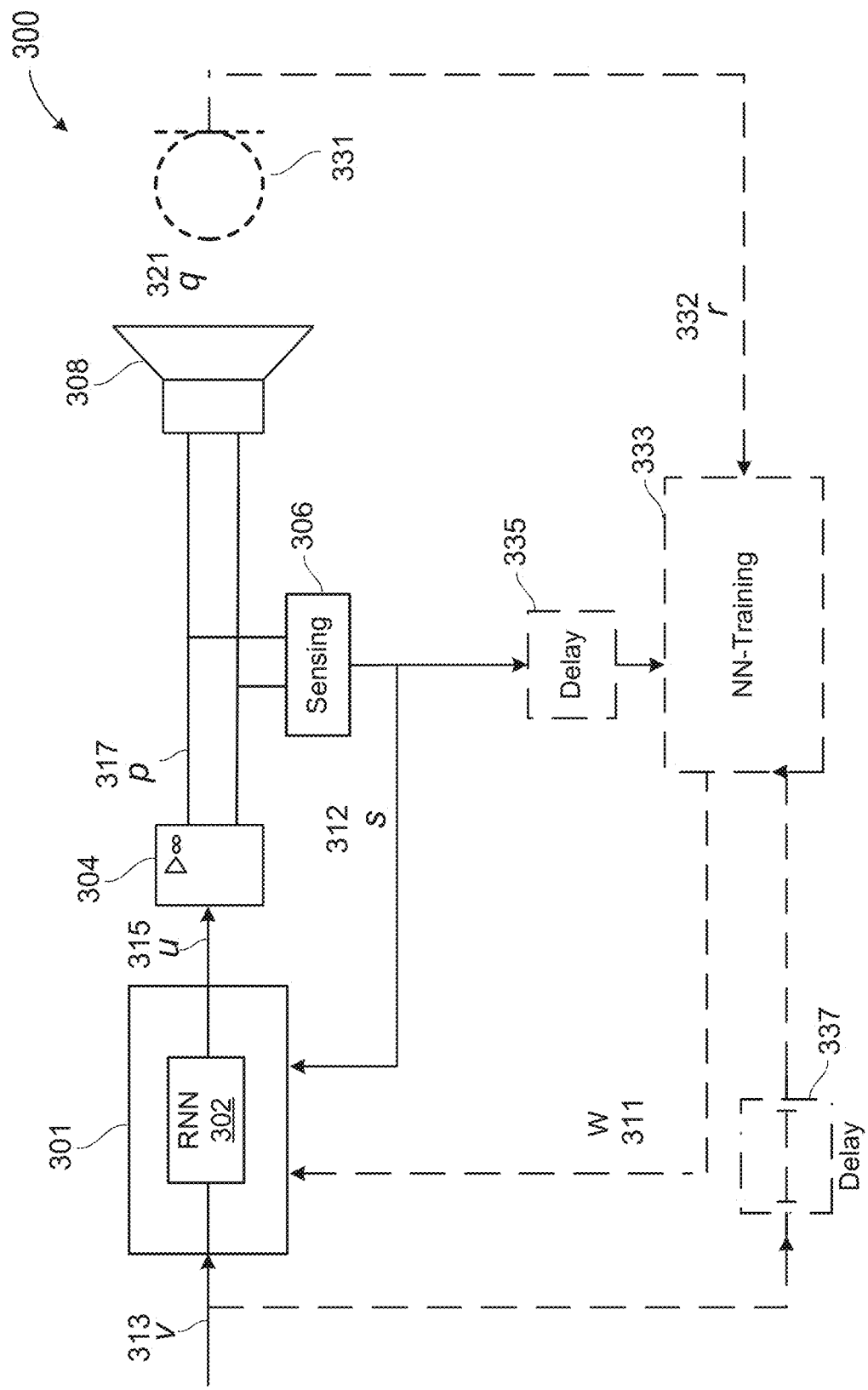
FIG. 3 depicts a block diagram of a loudspeaker system, according to various embodiments of the present invention.

FIG. 3 depicts a block diagram of a loudspeaker system, according to various embodiments of the present invention. As shown in FIG. 3, loudspeaker system 300 includes a processor 301, an amplifier 304, a sensing circuit 306, and a loudspeaker 308. The processor 301 deploys a neural network (NN), for example, a recurrent neural network (RNN) 302, with trained parameters W 311 to convert a source signal v 313 to a justified source signal u 315. The justified source signal u 315 is also referred to as the compensated signal or the pre-processed signal. The amplifier 304 amplifies the justified source signal u 315 to produce an amplified signal p 317 and feed it to the loudspeaker 308 for playback. Loudspeaker 308 produces an output acoustic signal q 321. In some embodiments, the RNN can include a memory device storing a plurality of parameters of RNN.

The sensing circuit 306 measures a voltage and a current of the amplified signal p 317 and sends a sensing output signals 312, including the measured signals, to the processor 301. An example of the sensed current signal and sensed voltage signal are illustrated in FIG. 2. As described above, in FIG. 2, diagram (a) shows a spectrogram of the recorded signal of a play back of a sweeping tone. The horizontal axis shows the time, from zero to three seconds, and the vertical axis shows the frequency of the detected signal. In FIG. 2, diagram (b) shows the spectrum of sensed current signal I-sense, and diagram (c) shows the spectrum of sensed voltage signal V-sense. The spectrograms of the current and voltage signals (I-sense and V-sense) respectively resembles the spectrogram of original sweeping tone 201, showing similar distorted features. The inventor has identified the measured current signal and voltage signal and their spectrograms as useful quantities for a neural network to learn the mapping between the source signal v 313 and the justified source signal u 315.

Figure 4:
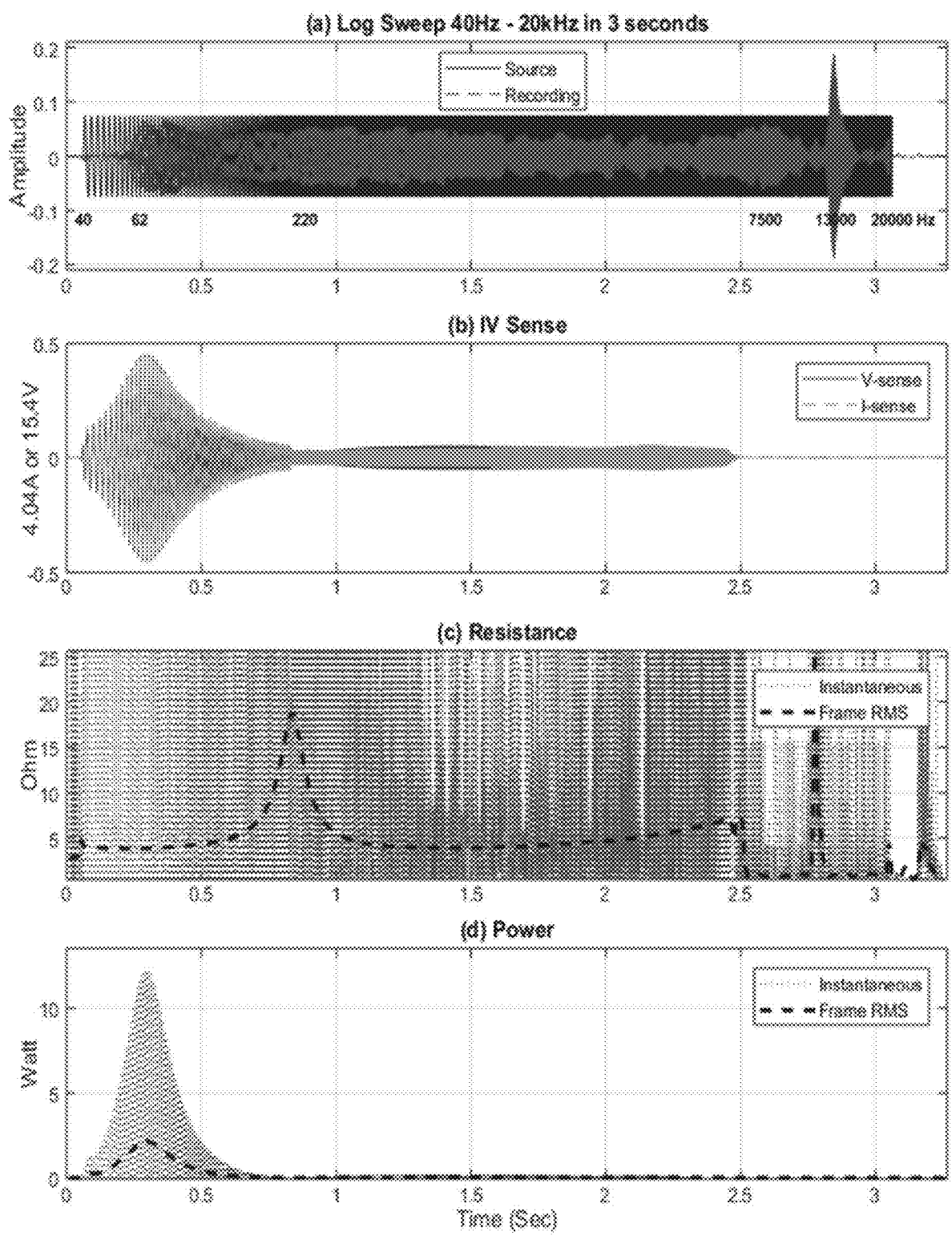
FIG. 4 illustrates the temporal waveforms of a recorded sweeping tone, corresponding IV sense signals, and derived features according to some embodiments of the present invention.

FIG. 4 illustrates the temporal waveforms of a recorded sweeping tone, corresponding IV-sense signals, and derived features according to some embodiments of the present invention. In FIG. 4, the horizontal axis shows the time, from zero to three seconds. Diagram (a) shows the amplitude of a sweeping signal with frequency increasing from 40 Hz to 20 kHz in three seconds in logarithmic scale. The solid line illustrates the source signal and the dashed line illustrates the recording signal. In the time domain, the varying magnitude of the recording in FIG. 4 (a) shows the frequency response of the system that requires equalization. In FIG. 4, diagram (b) shows IV-sense signals, with the solid line illustrating the voltage sense signal (V-sense) and the dashed line illustrating the current sense signal (I-sense). Further, diagram (c) shows the resistance derived from the sensing output (V/I), with the dotted line showing the instantaneous resistance and the thick dashed line illustrating the frame root-mean-square (RMS) resistance. Other parameters can also be used in the neural network. These parameters can include conductance (I/V), differential resistance (dV/dI), or differential conductance (dI/dV). Diagram (d) shows plots of power (IV) versus time, with the dotted line showing the instantaneous power and the thick dashed line illustrating the frame root-mean-square (RMS) power. These derived features, as nonlinear context of physical meaning, can contribute to the neural network learning.

In some cases, the distortion between the source signal and the recorded signal is easier to be observed in frequency domain. In these cases, it can be advantageous to convert time domain waveforms to frequency domain representations so that the neural network can conduct more meaningful learning. Many transforms can be applied in various audio applications. In some embodiments of the present invention, reconstructable transforms are used. For example, fast Fourier transform (FFT) can be employed to achieve the reconstruction. The examples illustrated in FIG. 2 were derived using FFT. For FFT, if a 1024-sample window is used, the number of the frequency bins is 512, each being represented by a complex number, i.e., 1024 real numbers to be learned. In some embodiments, discrete Fourier transform (DFT) can be used.

Figure 5:
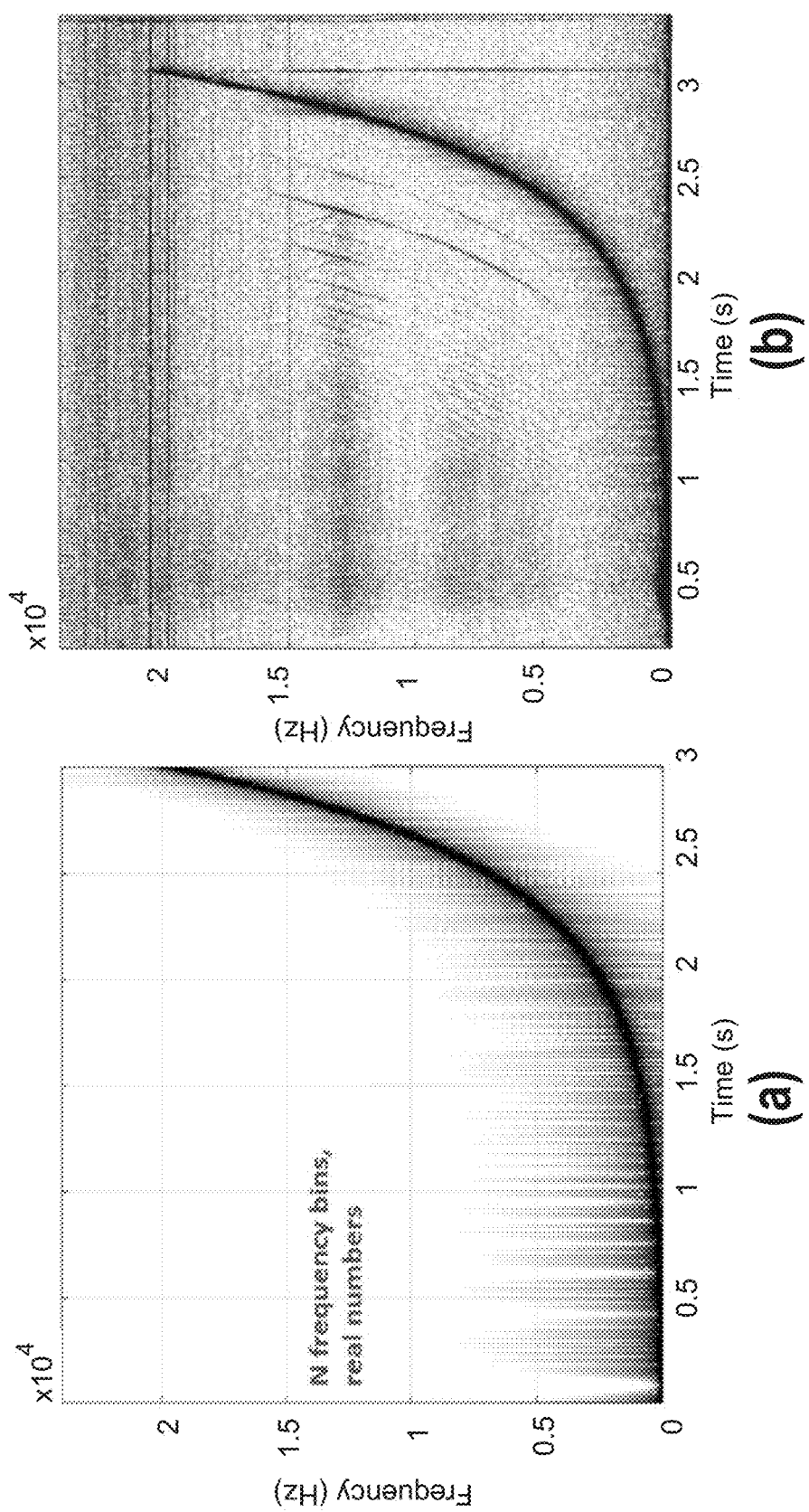
FIG. 5 depicts modified discrete cosine transform (MDCT) of the sweeping source signal and recorded signal, according to some embodiments of the present invention.

Other reconstructable transforms can also be used in embodiments of the invention. FIG. 5 depicts modified discrete cosine transform (MDCT) of the sweeping source signal and recorded signal. In both diagram (a) and diagram (b), the horizontal axis shows Time in seconds (s), and the vertical axis shows Frequency in (Hz). In FIG. 5, diagram (a) shows the MDCT transform of the sweeping source signal, and diagram (b) shows the MDCT transform of the recorded signal. Given the same setting, each bin is represented by a real number, i.e., only 512 real numbers to be learned. Similar to MDCT, modified discrete sine transform (MDST) can also be applied.

Figure 6:
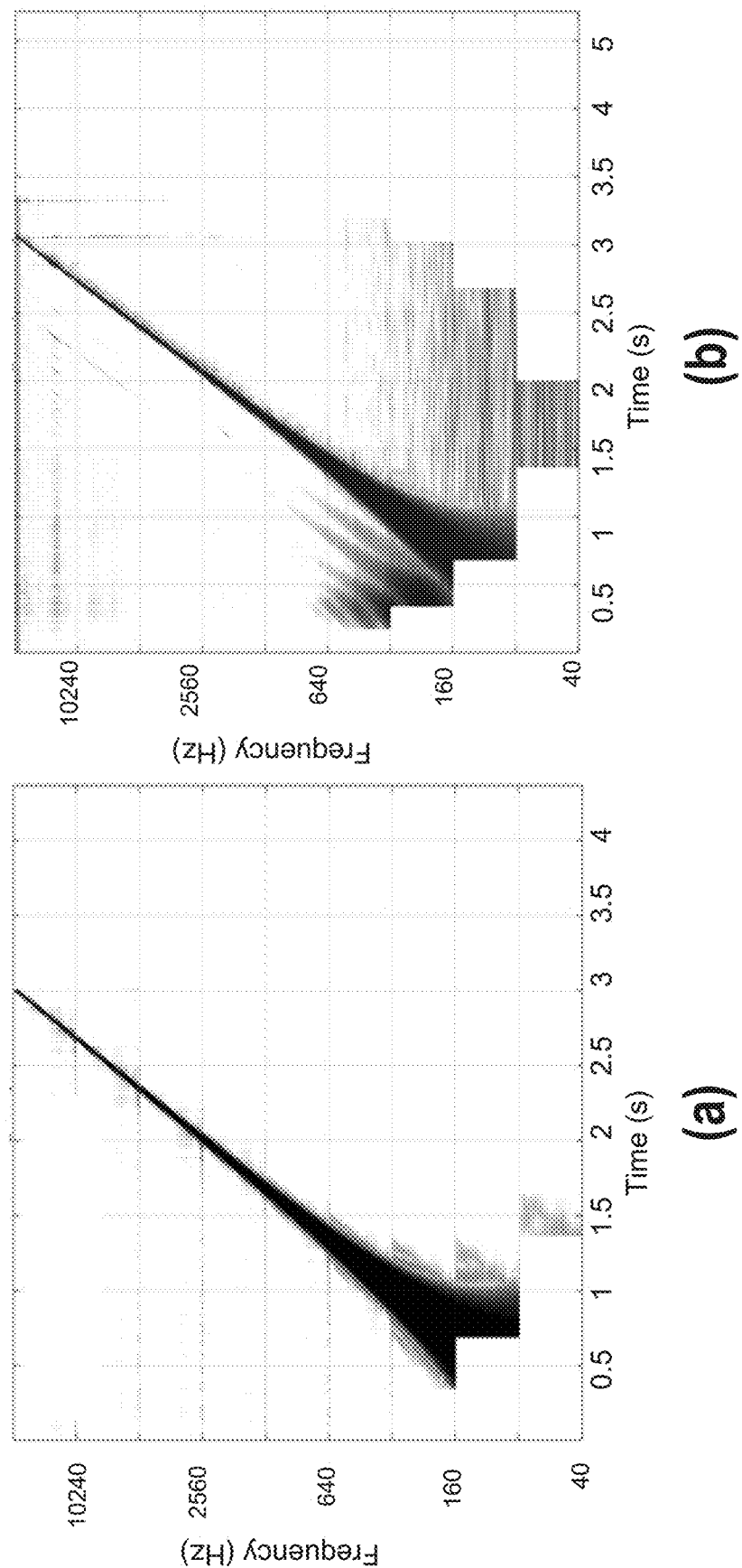
FIG. 6 depicts constant-Q transform (CQT) of the sweeping source signal and recorded signal, according to some embodiments of the present invention.

FIG. 6 depicts constant-Q transform (CQT) of the sweeping source signal and recorded signal. In FIG. 6, diagram (a) shows the CQT transform of the sweeping source signal, and diagram (b) shows the CQT transform of the recorded signal. Constant-Q transform (CQT) is yet another transform suitable for perfect reconstruction, but with frequency bins distributed logarithmically along the frequency axis. Given a frequency range of 40 Hz to 20 kHz (about 9 octaves), with a resolution 12 bins per octave, each bin being represented by a complex number, only 9×12×2=216 real numbers are required to be learned. In the case that near perfect reconstruction is accepted, variable-Q transform (VQT) can be applied, where the frequency distribution may correspond to the equivalent rectangular bandwidths (ERB) or Bark scale.

Some frequency domain representations like mel-frequency cepstral coefficients (MFCC) or perceptual linear prediction (PLP), though not reconstructable, provide auditory-relative cues suitable for source-signal-related features to enhance the learning. Other suitable frequency based source-signal-related features are spectral centroid, spectral flux, spectral roll-off, spectral variability, spectral entropy, zero crossing rate, and/or peak frequency. In time domain waveforms, useful features include mean magnitude, root-mean-square value, skewness, kurtosis, maximum magnitude, crest factor, and/or energy entropy. These source-signal-related features provide a variety of audio characteristics as the context, so that the neural network can allocate more resource to learn the other mapping rules between.

Referring back to FIG. 3, a loudspeaker system 300, according to various embodiments of the present invention, includes a loudspeaker 308 that play back an acoustic signal v 313 based upon an amplified signal p 317. Loudspeaker system 300 also includes an amplifier 304 connected to the loudspeaker 308. The amplifier 304 is configured to receive a justified source signal u 315, generate the amplified signal p 317 based upon the justified source signal u 315, and transmit the amplified signal p 317 to the loudspeaker 308. The justified source signal u (315) is also referred to as the compensated signal or the pre-processed signal. Loudspeaker system 300 also includes a sensing circuit 306 connected to the amplified output signal p 317. The sensing circuit 306 is configured to measure a voltage and a current of the amplified signal p 317 and generate a sensing output signal s 312 including the measured voltage and the measured current.

Loudspeaker system 300 also includes a processor 301 configured to receive a source signal v 313 and the sensing output signal s 312. Processor 301 is also configured to derive sensing-related features based upon the sensing output signal s 312 and transform the source signal s 312 to a reconstructable frequency domain representation. Processor 301 is also configured to derive source-signal-related features. Processor 301 is also configured to deploy a trained recurrent neural network (RNN) 302 to convert the frequency domain representation to a justified frequency domain representation based upon the features derived from the source signal and the sensing output signal. Processor 301 is also configured to inversely transform the justified frequency domain representation to the justified source signal u 315, and send the justified source signal u 315 to the amplifier.

FIG. 3 further shows a training setup (as shown in the dashed-line portion) comprising a microphone 331, a neural network training device 333, and two delay devices 335 and 337. The microphone converts the acoustic signal q 321 played back by the loudspeaker to a recorded signal r 332. The delay devices 335 and 337 synchronize the source signal source signal v 313 and the sensing output signal s 312 with the recorded signal r 332. The neural network training device (e.g., a computer) trains the parameters W 311 of the recurrent neural network 302 based upon the source signal v 313, the sensing output signals 312, the recorded signal r 332, and the features derived from the source signal v 313 and the sensing output signal s 312.

As described above, a neutral network is used to compensate the input source signal to reduce output distortion. In some embodiments, neural networks can be applied to perform the offline machine learning. Examples of neural networks are described below. An example of a generic neural network is described with reference to FIG. 7, and two examples of recurrent neural network are described with reference to FIGS. 8 and 9.

Figure 7:
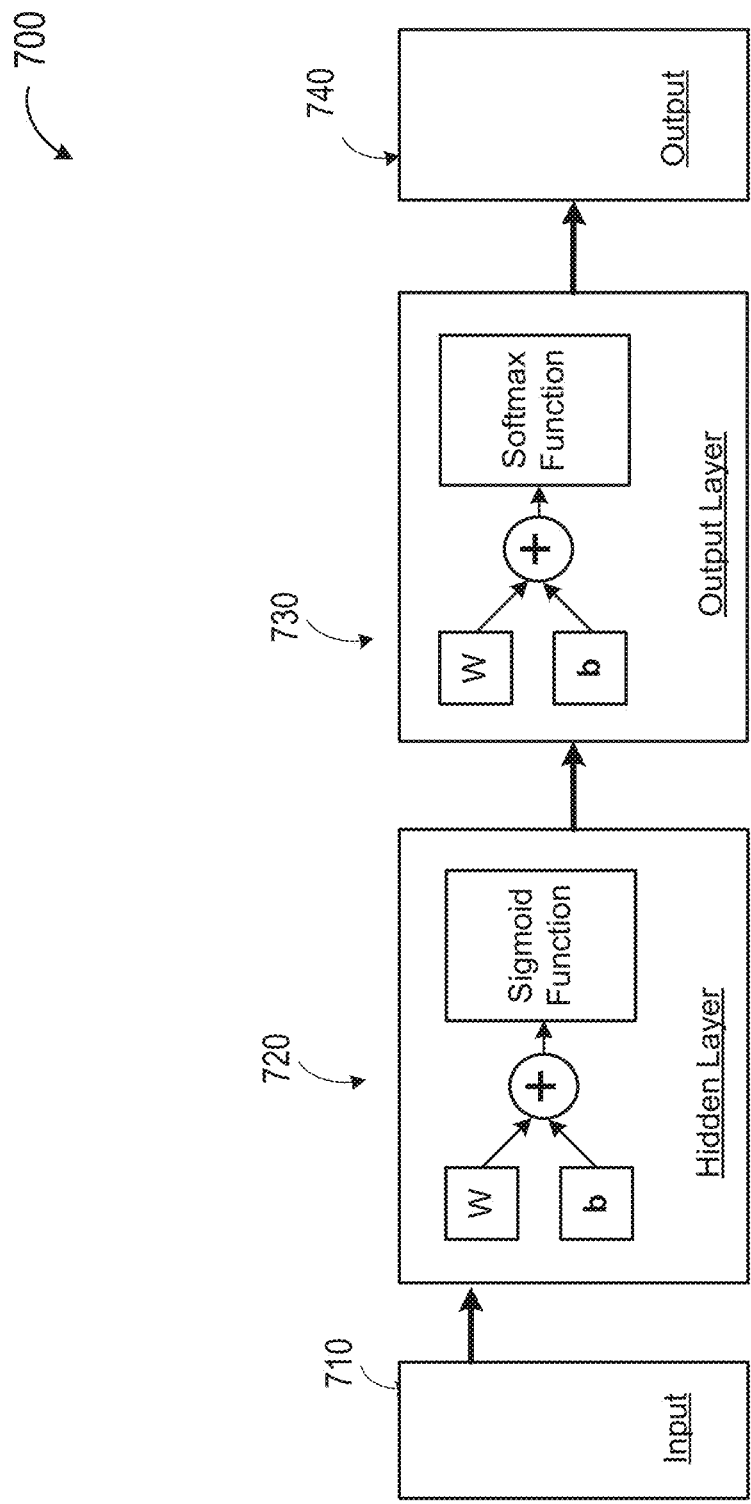
FIG. 7 is a block diagram illustrating an exemplar two-layer feed-forward neural network that can also be used to build the area-function-based detection module, according to embodiments of the present invention.

FIG. 7 is a block diagram illustrating an exemplar two-layer feed-forward neural network that can also be used to build the area-function-based detection module according to embodiments of the present invention. In the example shown in FIG. 7, feed-forward neural network 700 includes an input port 710, a hidden layer 720, an output layer 730, and an output port 740. In this network, the information moves in only one direction, forward, from the input nodes, through the hidden nodes and to the output nodes. In FIG. 7, W represents a weighting vector, and b represents a bias factor.

In some embodiments, the hidden layer 720 can have sigmoid neurons, and the output layer 730 can have softmax neurons. A sigmoid neuron has an output relationship defined by a sigmoid function, which is a mathematical function having a characteristic "S"-shaped curve or sigmoid curve. Sigmoid functions have domain of all real numbers, with return value monotonically increasing most often from 0 to 1, or alternatively from −1 to 1, depending on the application. A wide variety of sigmoid functions can be used as the activation function of artificial neurons, including the logistic and hyperbolic tangent functions.

In the output layer 730, a softmax neuron has an output relationship defined by a softmax function. The softmax function, or normalized exponential function, is a generalization of the logistic function that "squashes" a K-dimensional vector z of arbitrary real values to a K-dimensional vector σ (z) of real values, where each entry is in the range (0, 1), and all the entries adds up to 1. The output of the softmax function can be used to represent a categorical distribution—that is, a probability distribution over K different possible outcomes. The softmax function is often used in the final layer of a neural network-based classifier. In FIG. 7, W represents a weighting vector, and b represents a bias factor.

To achieve reasonable classification, at least 10 neurons should be assigned in the first hidden layer. If more hidden layers are used, any number of neurons can be used in the additional hidden layer. Given more computing resources, more neurons or layers can be assigned. Providing enough neurons in its hidden layer, the performance can be improved. More complicated networks (e.g., a convolutional neural network or recurrent neural network) can also be applied to achieve better performance. Given enough neurons in its hidden layer, it can classify vectors arbitrarily well.

Figure 8:
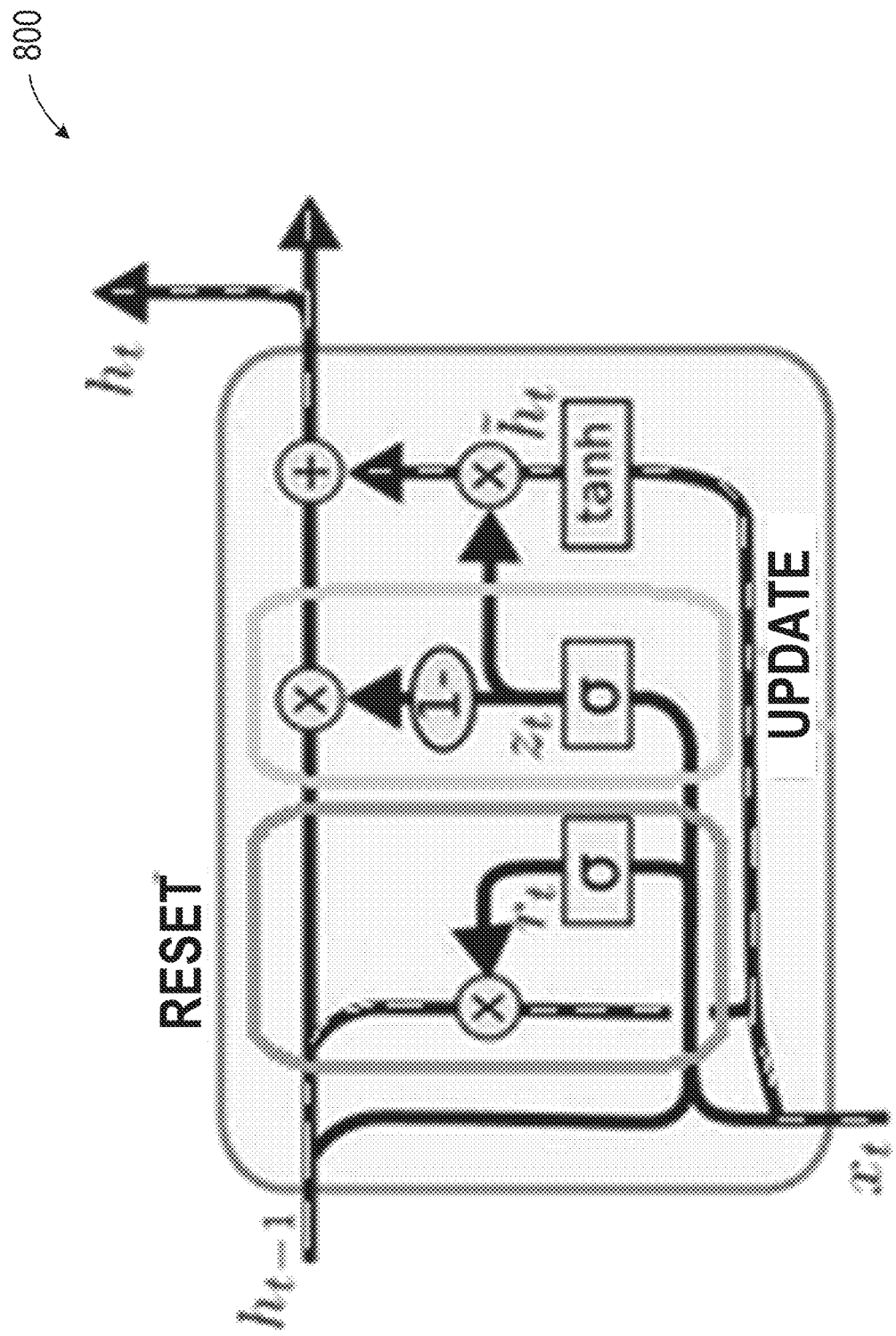
FIG. 8 depicts a cell of an example of a gated recurrent unit (GRU) neural network.
Figure 9:
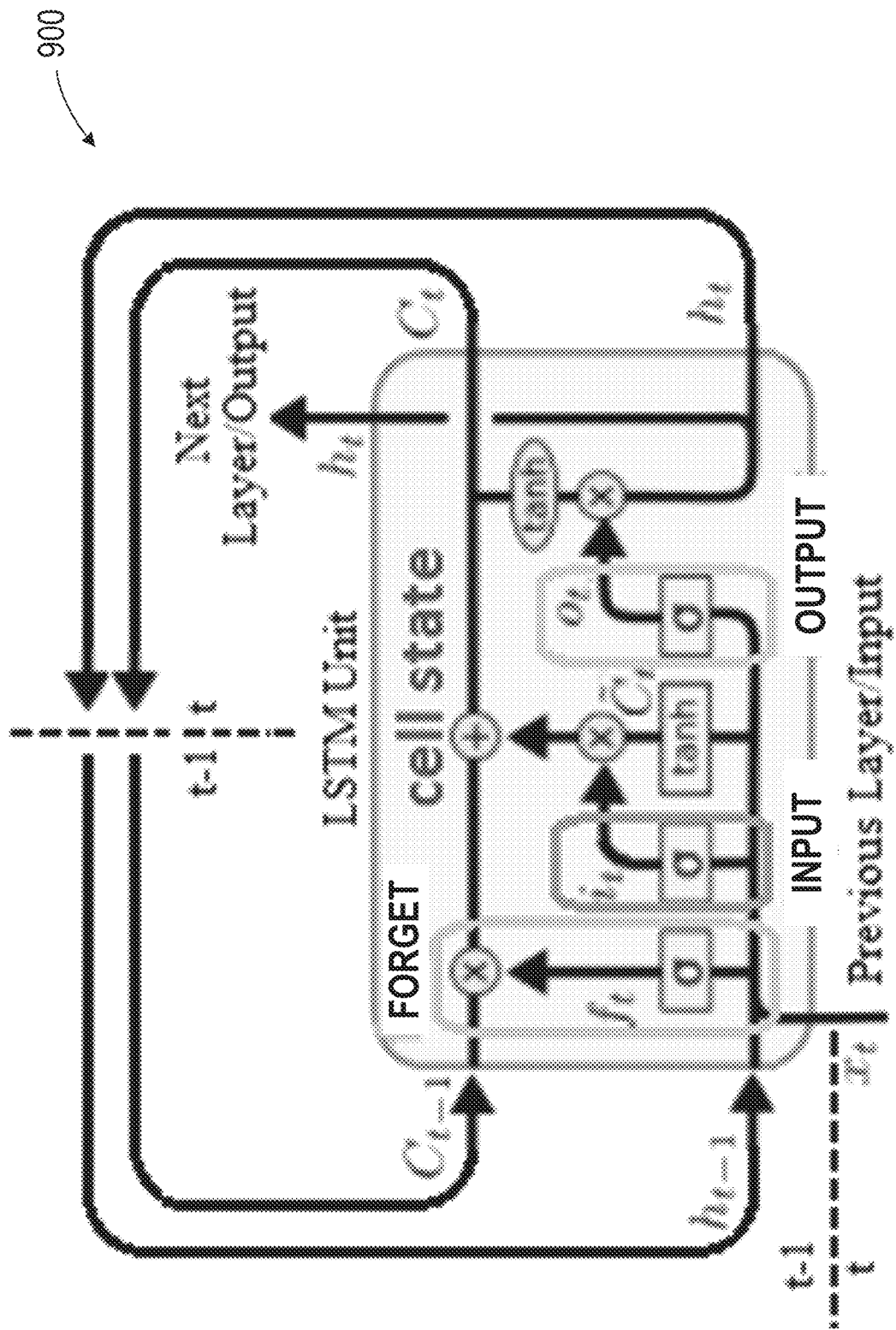
FIG. 9 depicts a cell of an example of a long short-term memory (LSTM) neural network.

In embodiments of the present invention, recurrent neural networks (RNNs) are used for processing sequence data for predictions. Suitable RNNs include simple recurrent neural networks (RNN), gated recurrent unit (GRU), as shown in FIG. 8, and long short-term memory (LSTM) networks, as shown in FIG. 9, etc. GRUs use fewer tensor operations than LSTMs; therefore, GRUs are a little speedier to train than LSTMs. On the other hand, LSTMs can provide the most controlability and thus, better results, but also comes with more complexity and operating cost.

FIG. 8 depicts a cell 800 of a GRU neural network, where $x_t$ is the input, $h_t$ is the output, $h_{t-1}$ is the previous output, and a hyperbolic tangent function (tanh) is used as the activation function to help regulate the values flowing through the network ($\tilde{h}_t$). The GRU cell has a reset gate to decide how much past information ($r_t$) to forget, and an update gate to decide what information to throw away ($1-z_t$) and what new information to add ($z_t$), where the reset factor ($r_t$) and the update factor ($z_t$) are determined by sigmoid activations (σ).

FIG. 9 depicts a cell 900 of an LSTM neural network, where $x_t$ is the input, $h_t$ is the output, $h_{t-1}$ is the previous output, $C_t$ is the cell state, $C_{t-1}$ is the previous cell state, and $\tilde{C}_t$ is a regulated cell state activated by a first tanh function. The LSTM cell has three different gates that regulate information flow in: a forget gate to decide what information should be thrown away or kept ($f_t$), an input gate to decide which information is important to keep ($i_t$) from the first tanh output ($\tilde{C}_t$), and an output gate to decide what information the hidden state should carry ($o_t$) from the second tanh output (tanh $C_t$), where the factors are determined by sigmoid activations ($\sigma$).

Figure 10:
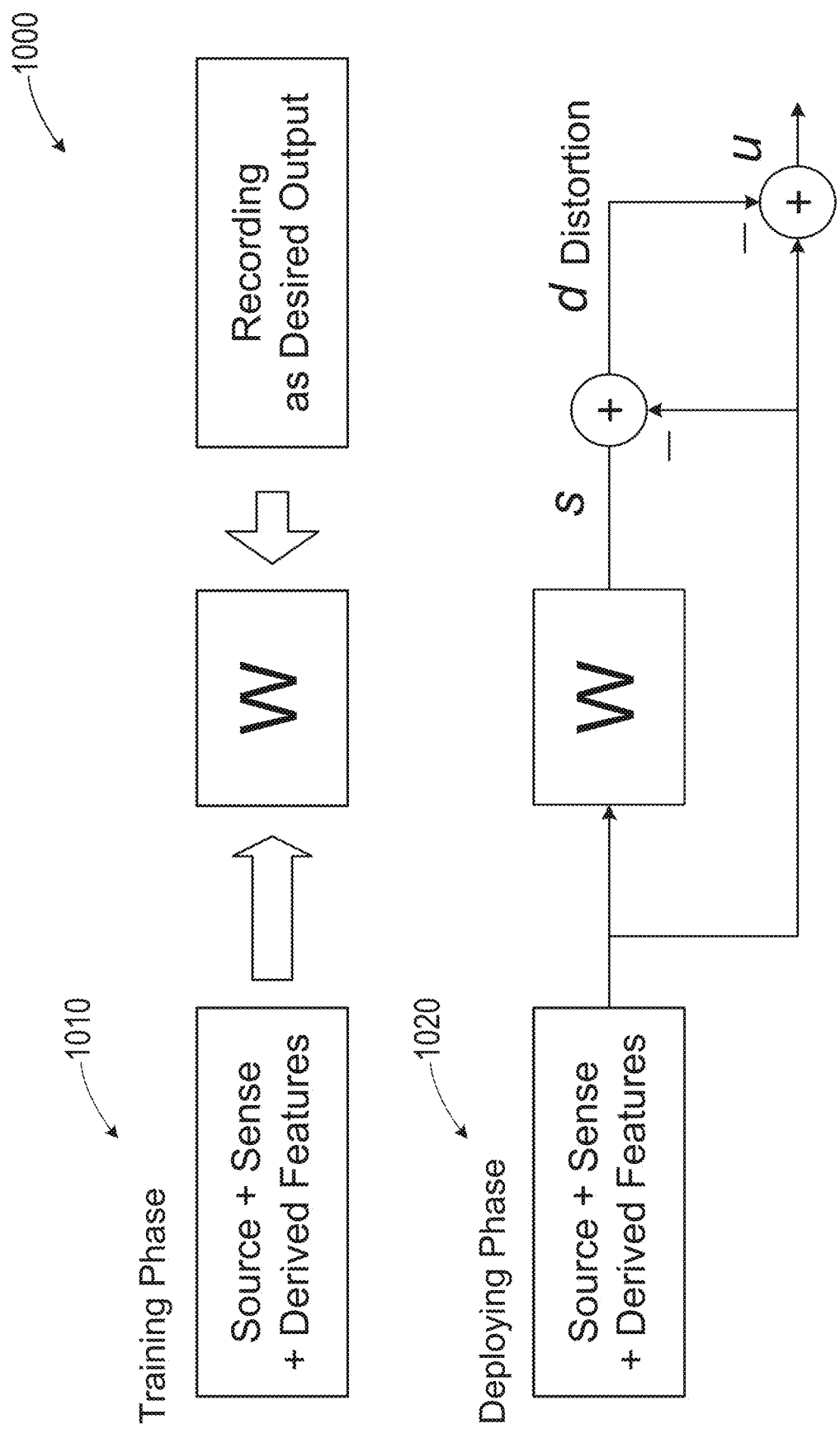
FIG. 10 depicts a forward training scheme, according to various embodiments of the present invention.

FIG. 10 depicts a forward training scheme 1000, according to various embodiments of the present invention. In the training phase 1010, the training device designates the source signal as the original content, the sensing output along with the derived features as the context, and the recorded signal as the desired output to train the parameters (W). In the deploying phase 1020, the trained neural network with trained parameters predicts an inferred signal (s) based on the original content and the context. A distortion (d) can be obtained by subtracting the source signal from the inferred signal. Finally, the justified signal, also referred to as the compensated signal, (u) can be obtained by summing the source signal and the anti-phase of the distortion. In FIG. 10, the anti-phase is shown by the "-" operator.

Figure 11:
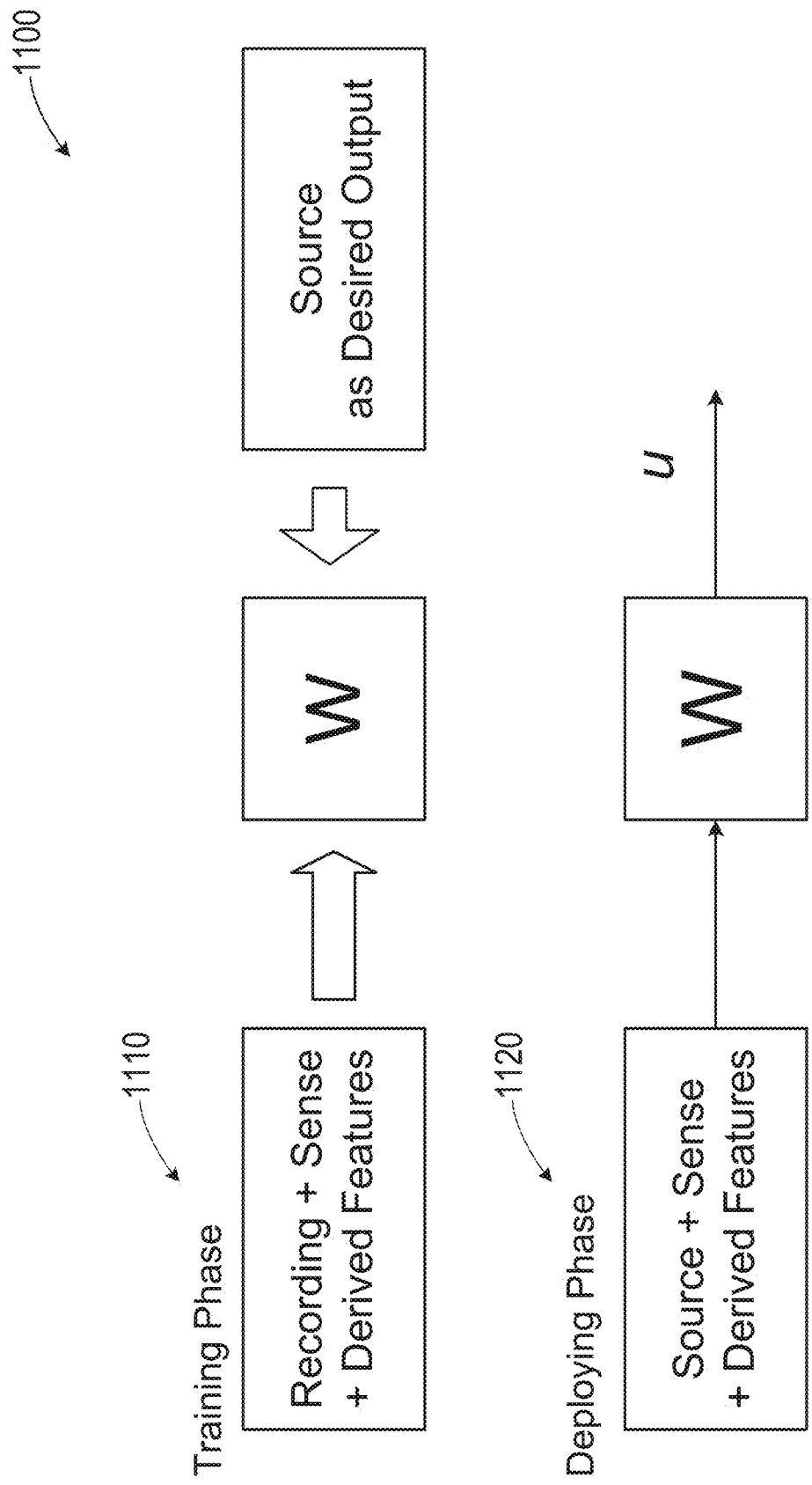
FIG. 11 depicts an inverse training scheme, according to various embodiments of the present invention.

FIG. 11 depicts an inverse training scheme 1100, according to various embodiments of the present invention. In the training phase 1110, the training device receives the recorded signal (as the content), the sensing output along with their derived features (as the context), and the source signal (as the desired output) to train the parameters (W). In deploying phase 1120, the trained neural network directly predicts the justified signal (u) based on the content and the context. This scheme configures the neural network to infer the source signal based on the recorded signal in the training phase. As the optimal playback is the source signal, the trained neural network will therefore infer the justified signal that produces the desired playback.

Figure 12:
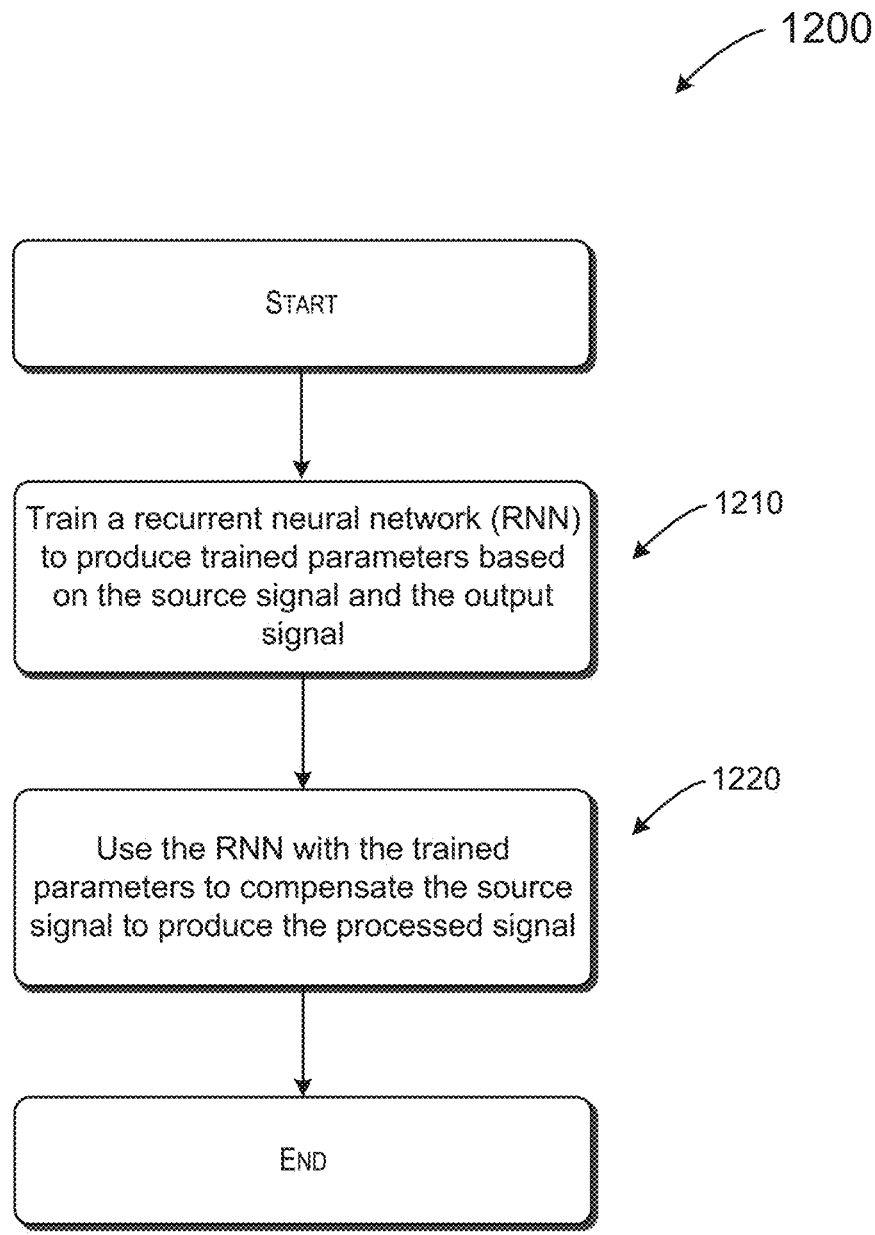
FIG. 12 is a simplified flowchart illustrating a method for playing an acoustic signal in a loudspeaker system, according to various embodiments of the present invention.

FIG. 12 is a simplified flowchart illustrating a method for playing an acoustic signal in a loudspeaker system according to various embodiments of the present invention. An example of the loudspeaker system is shown in FIG. 3. As shown in FIG. 3, a loudspeaker system 300 includes a processor 301 for receiving a source signal v 313 and producing a processed signal u 315, an amplifier 305 for amplifying the processed signal u 315 to provide an amplified signal p 317, and a loudspeaker 308 for receiving the amplified signal p 317 and producing an output signal q 321. As shown in FIG. 3, method 1200 includes, at 1210, in a training phase, training a recurrent neural network (RNN) to produce trained parameters based on the source signal and the output signal. Method 1200 also includes, at 1220, in a deploying phase, using the RNN with the trained parameters to compensate the source signal to operate the loudspeaker system.

In the training phase, at 1210, the method includes deriving sensing-related features based upon sensed output signal, using a microphone configured to convert the acoustic signal played back by the loudspeaker to a recorded signal, transforming the source signal to a first frequency domain representation, transforming recorded signal of output signal to a second frequency domain representation, and training the RNN to produce trained parameters based upon the first frequency domain representation, the second frequency domain representation, and the features derived from the source signal and the sensed output signal. A process of the training phase is described above with reference to FIG. 3. An example of a neural network is described above with reference to FIG. 7, and examples of RNN are described above with reference to FIGS. 8 and 9.

In the deploying phase, at 1220, the method includes receiving the source signal and sensing the output signal, deriving sensing-related features based upon sensed output signal, transforming the source signal to a reconstructable frequency domain representation, deploying the trained RNN with the trained parameters to convert the reconstructable frequency domain representation to a compensated frequency domain representation based upon the features derived from the source signal and the sensed output signal, inversely transforming the compensated frequency domain representation to a compensated source signal, and sending the compensated source signal to the amplifier. A process of the deploying phase is described above with reference to FIG. 3.

In some embodiments, the recurrent neural network is trained by a forward training scheme where the first frequency domain representation is designated as an input and the second frequency domain representation is designated as a desired output. An example of this training process is described above with reference to FIG. 10.

In some embodiments, the recurrent neural network is trained by an inverse training scheme where the second frequency domain representation is designated as an input and the first frequency domain representation is designated as a desired output. An example of this training process is described above with reference to FIG. 11.

Figure 13:
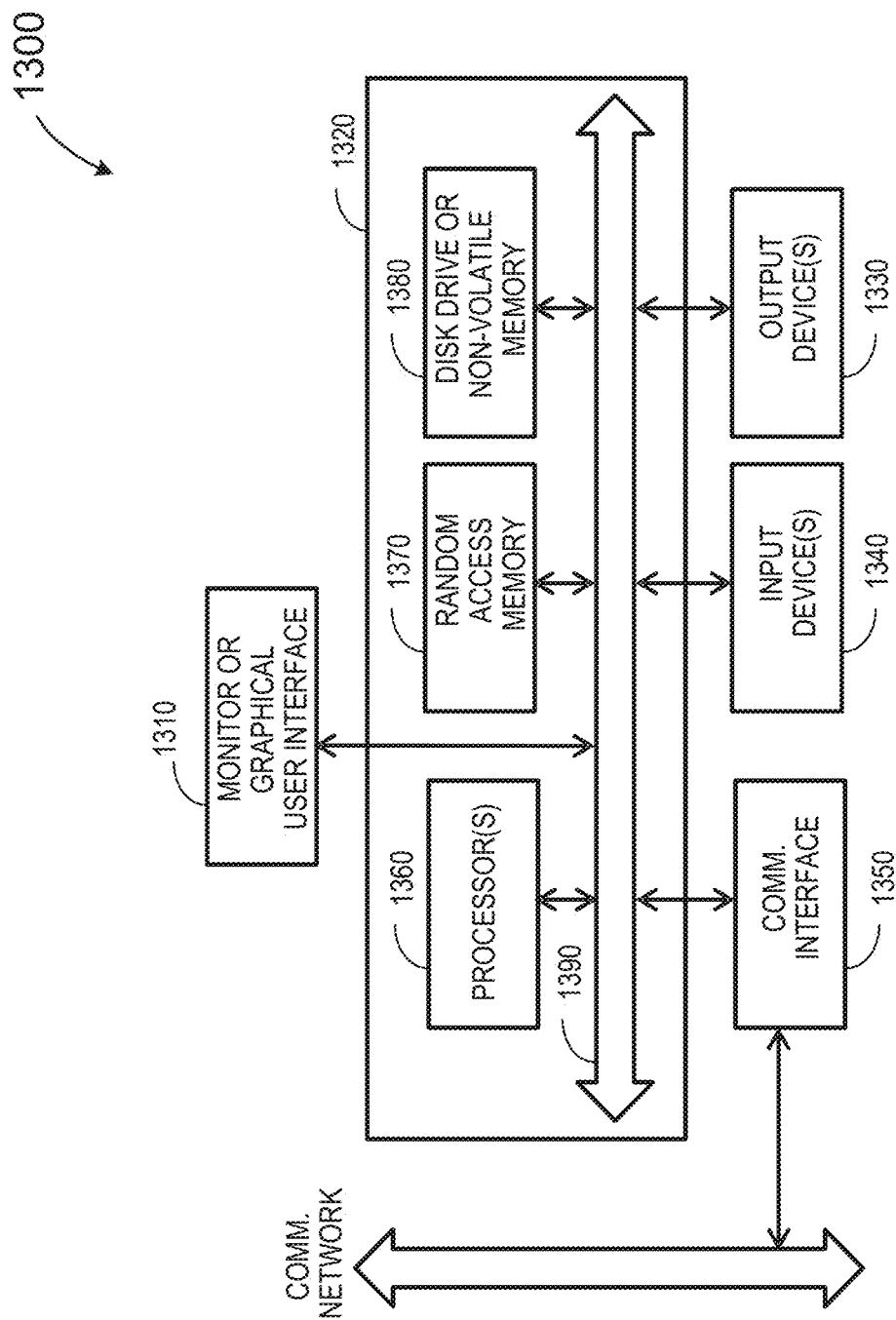
FIG. 13 is a simplified block diagram illustrating an apparatus that may be used to implement various embodiments, according the present invention.

FIG. 13 is a simplified block diagram illustrating an apparatus that may be used to implement various embodiments, according the present invention. FIG. 13 is merely illustrative of an embodiment incorporating the present disclosure and does not limit the scope of the disclosure as recited in the claims. One of ordinary skill in the art would recognize other variations, modifications, and alternatives. In one embodiment, computer system 1300 typically includes a monitor 1310, a computer 1320, user output devices 1330, user input devices 1340, communications interface 1350, and the like.

FIG. 13 is representative of a computer system capable of embodying the present disclosure. For example, loudspeaker system 300 can be implemented using a system similar to system 1300 depicted in FIG. 13. The functions of processor 301 and neural network training unit 333 can be carried out by one or more processors depicted in FIG. 13. The speaker 308, microphone 331, and sensing circuit 306 can be peripheral devices in a system similar to system 1300. Moreover, the offline training of the machine-learning systems can be carried out in a system similar to system 1300 depicted in FIG. 13.

As shown in FIG. 13, computer 1320 may include processor(s) 1360 that communicate with a number of peripheral devices via a bus subsystem 1390. These peripheral devices may include user output devices 1330, user input devices 1340, communications interface 1350, and a storage subsystem, such as random-access memory (RAM) 1370 and disk drive 1380.

User input devices 1340 can include all possible types of devices and mechanisms for inputting information to computer system 1320. These may include a keyboard, a keypad, a touch screen incorporated into the display, audio input devices, such as voice recognition systems, microphones, and other types of input devices. In various embodiments, user input devices 1340 are typically embodied as a computer mouse, a trackball, a track pad, a joystick, a wireless remote, a drawing tablet, a voice command system, an eye tracking system, and the like. User input devices 1340 typically allow a user to select objects, icons, text, and the like that appear on the monitor 1310 via a command, such as a click of a button or the like.

User output devices 1330 include all possible types of devices and mechanisms for outputting information from computer 1320. These may include a display (e.g., monitor 1310), non-visual displays such as audio output devices, etc.

Communications interface 1350 provides an interface to other communication networks and devices. Communications interface 1350 may serve as an interface for receiving data from and transmitting data to other systems. Embodiments of communications interface 1350 typically include an Ethernet card, a modem (telephone, satellite, cable, ISDN), an (asynchronous) digital subscriber line (DSL) unit, FireWire interface, USB interface, and the like. For example, communications interface 1350 may be coupled to a computer network, to a FireWire bus, or the like. In other embodiments, communications interfaces 1350 may be physically integrated on the motherboard of computer 1320, and may be a software program, such as soft DSL, or the like.

In various embodiments, computer system 1300 may also include software that enables communications over a network such as the Hypertext Transfer Protocol (HTTP), the Transmission Control Protocol and the Internet Protocol (TCP/IP), the Real Time Streaming Protocol and Real-time Transport Protocol (RTSP/RTP) protocols, and the like. In alternative embodiments of the present disclosure, other communications software and transfer protocols may also be used, for example, Internetwork Packet Exchange (IPX), User Datagram Protocol (UDP), or the like. In some embodiments, computer 1320 includes one or more Xeon microprocessors from Intel as processor(s) 1360. Further, in one embodiment, computer 1320 includes a UNIX-based operating system. Processor(s) 1360 can also include special-purpose processors, such as digital signal processor (DSP) and/or reduced instruction set computer (RISC).

RAM 1370 and disk drive 1380 are examples of tangible storage media configured to store data such as embodiments of the present disclosure, including executable computer code, human-readable code, or the like. Other types of tangible storage media include floppy disks, removable hard disks, optical storage media such as CD-ROMS, DVDs and bar codes, semiconductor memories such as flash memories, read-only memories (ROMS), battery-backed volatile memories, networked storage devices, and the like. RAM 1370 and disk drive 1380 may be configured to store the basic programming and data constructs that provide the functionality of the present disclosure.

Software code modules and instructions that provide the functionality of the present disclosure may be stored in RAM 1370 and disk drive 1380. These software modules may be executed by processor(s) 1360. RAM 1370 and disk drive 1380 may also provide a repository for storing data used in accordance with the present disclosure.

RAM 1370 and disk drive 1380 may include a number of memories, including a main random-access memory (RAM) for storage of instructions and data during program execution and a read-only memory (ROM) in which fixed non-transitory instructions are stored. RAM 1370 and disk drive 1380 may include a file storage subsystem providing persistent (non-volatile) storage for program and data files. RAM 1370 and disk drive 1380 may also include removable storage systems, such as removable flash memory.

Bus subsystem 1390 provides a mechanism for letting the various components and subsystems of computer 1320 communicate with each other as intended. Although bus subsystem 1390 is shown schematically as a single bus, alternative embodiments of the bus subsystem may utilize multiple busses.

FIG. 13 is representative of a computer system capable of embodying the present disclosure. It will be readily apparent to one of ordinary skill in the art that many other hardware and software configurations are suitable for use with the present disclosure. For example, the computer may be a desktop, portable, rack-mounted, or tablet configuration. Additionally, the computer may be a series of networked computers. Further, the use of other microprocessors are contemplated, such as Pentium™ or Itanium™ microprocessors, Opteron™ or AthlonXP™ microprocessors from Advanced Micro Devices, Inc., and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present disclosure can be implemented in the form of logic in software, hardware, or a combination of both. The logic may be stored in a computer-readable or machine-readable non-transitory storage medium as a set of instructions adapted to direct a processor of a computer system to perform a set of steps disclosed in embodiments of the present disclosure. The logic may form part of a computer program product adapted to direct an information-processing device to perform a set of steps disclosed in embodiments of the present disclosure. Based on the disclosure and teachings provided herein, a person of ordinary skill in the art will appreciate other ways and/or methods to implement the present disclosure.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices, such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

Certain embodiments have been described. However, various modifications to these embodiments are possible, and the principles presented herein may be applied to other embodiments as well. In addition, the various components and/or method steps/blocks may be implemented in arrangements other than those specifically disclosed without departing from the scope of the claims. Other embodiments and modifications will occur readily to those of ordinary skill in the art in view of these teachings. Therefore, the following claims are intended to cover all such embodiments and modifications when viewed in conjunction with the above specification and accompanying drawings.

What is claimed is:

1. A loudspeaker system, comprising:
a loudspeaker to play back an acoustic signal based upon an amplified signal;
an amplifier connected to the loudspeaker, the amplifier configured to:
receive a justified source signal;
generate the amplified signal based upon the justified source signal; and
transmit the amplified signal to the loudspeaker;
a sensing circuit connected to the amplified signal, the sensing circuit configured to:
measure a voltage and a current of the amplified signal; and
generate a sensing output signal including the measured voltage and the measured current; and
a processor being configured to:
receive a source signal and the sensing output signal;
derive sensing-related features based upon the sensing output signal;
transform the source signal to a reconstructable frequency domain representation;
derive source-signal-related features;
deploy a trained recurrent neural network (RNN) to convert the reconstructable frequency domain representation to a justified frequency domain representation based upon the sensing-related features and the source-signal-related features:
inversely transform the justified frequency domain representation to the justified source signal; and
send the justified source signal to the amplifier;
wherein the system comprises a memory device storing a plurality of parameters of the recurrent neural network;
wherein the recurrent neural network is trained with a setup comprising:
a microphone configured to convert the acoustic signal played back by the loudspeaker to a recorded signal;
a first delay device configured to synchronize the source signal with the recorded signal;
a second delay device configured to synchronize the sensing output signal with the recorded signal; and
a neural network training device configured to:
receive the source signal and the sensing output signal;
derive the sensing-related features based upon the sensing output signal;
transform the source signal to a first frequency domain representation;
derive the source-signal-related features;
transform the recorded signal to a second frequency domain representation; and
train the plurality of parameters of the recurrent neural network based upon the first frequency domain representation, the second frequency domain representation, the sensing-related features, and the source-signal-related features;
wherein the trained recurrent neural network is bypassed during training phase and the justified source signal is the source signal.

2. The system of claim 1, wherein the sensing-related features include one or more of resistance, conductance, differential resistance, differential conductance, instantaneous power, and root-mean-square power.

3. The system of claim 1, wherein the reconstructable frequency domain representation is selected from the group consisting of fast Fourier transform (FFT), discrete Fourier transform (DFT), modified discrete cosine transform (MDCT), modified discrete sine transform (MDST), constant-Q transform (CQT), and variable-Q transform (VQT) using a filter channel distribution according to equivalent rectangular bandwidths (ERB) or Bark scale.

4. The system of claim 1, wherein the source-signal-related features comprise one or more of mel-frequency cepstral coefficients (MFCC) or perceptual linear prediction (PLP), spectral centroid, spectral flux, spectral roll-off, zero crossing rate, peak frequency, crest factor, energy entropy, mean magnitude, root-mean-square value, skewness, kurtosis, and maximum magnitude.

5. The system of claim 1, wherein the recurrent neural network is a gate recurrent unit (GRU).

6. The system of claim 1, wherein the recurrent neural network is a long-short-term memory (LSTM).

7. The system of claim 1, wherein the recurrent neural network is trained by a forward training scheme where the first frequency domain representation is designated as an input and the second frequency domain representation is designated as a desired output.

8. The system of claim 1, wherein the recurrent neural network is trained by an inverse training scheme where the second frequency domain representation is designated as an input and the first frequency domain representation is designated as a desired output.

9. A loudspeaker system, the loudspeaker system comprising:
a processor for receiving a source signal and producing a processed signal;
an amplifier for amplifying the processed signal to provide an amplified signal; and
a loudspeaker for receiving the amplified signal and producing an output signal;
wherein the processor is configured to, in a deploying phase, use a recurrent neural network (RNN) with trained parameters to compensate the source signal to produce the processed signal,
wherein the RNN is trained to produce the trained parameters based on the source signal and the output signal;
wherein the processor is further configured to:
in a training phase,
derive sensing-related features based upon sensed output signal;
use a microphone configured to convert the acoustic signal played back by the loudspeaker to a recorded signal;
transform the source signal to a first frequency domain representation;
transform recorded signal of output signal to a second frequency domain representation; and
train the RNN to produce trained parameters based upon the first frequency domain representation, the second frequency domain representation, the sensing-related features, and the source-signal-related features.

10. The loudspeaker system of claim 9, wherein the recurrent neural network is trained using a forward training scheme that the first frequency domain representation is designated as an input and the second frequency domain representation is designated as a desired output.

11. The loudspeaker system of claim 9, wherein the recurrent neural network is trained using an inverse training scheme that the second frequency domain representation is designated as an input and the first frequency domain representation is designated as a desired output.

12. The loudspeaker system of claim 9, further configured to:
in the deploying phase,
receive the source signal and sensing the output signal;
derive sensing-related features based upon sensed output signal;
transforming the source signal to a reconstructable frequency domain representation;
deploy the trained RNN with the trained parameters to convert the reconstructable frequency domain representation to a compensated frequency domain representation based upon the sensing-related features and the source-signal-related features;
inversely transform the compensated frequency domain representation to a compensated source signal; and
send the compensated source signal to the amplifier.

13. A method for playing an acoustic signal in a loudspeaker system, the loudspeaker system including a processor for receiving a source signal and producing a processed signal, an amplifier for amplifying the processed signal to provide an amplified signal, and a loudspeaker for receiving the amplified signal and producing an output signal, the method comprising:
in a training phase, training a recurrent neural network (RNN) to produce trained parameters based on the source signal and the output signal; and
in a deploying phase, using the RNN with the trained parameters to compensate the source signal to produce the processed signal;
wherein, in the training phase, the method further comprises:
deriving sensing-related features based upon sensed output signal;
using a microphone configured to convert the output signal played back by the loudspeaker to a recorded signal;
transforming the source signal to a first frequency domain representation;
transforming the recorded signal of the output signal to a second frequency domain representation; and
training the RNN to produce trained parameters based upon the first frequency domain representation, the second frequency domain representation, the sensing-related features, and the source-signal-related features.

14. The method of claim 13, wherein the recurrent neural network is trained by a forward training scheme where the first frequency domain representation is designated as an input and the second frequency domain representation is designated as a desired output.

15. The method of claim 13, wherein the recurrent neural network is trained by an inverse training scheme where the second frequency domain representation is designated as an input and the first frequency domain representation is designated as a desired output.

16. The method of claim 13, further comprising:
in the deploying phase,
receiving the source signal and sensing the output signal;
deriving sensing-related features based upon the sensed output signal;
transforming the source signal to a reconstructable frequency domain representation;
deploying the trained RNN with the trained parameters to convert the reconstructable frequency domain representation to a compensated frequency domain representation based upon the sensing-related features and the source-signal-related features and the sensed output signal;
inversely transforming the compensated frequency domain representation to a compensated source signal; and
sending the compensated source signal to the amplifier.

* * * * *